L. H. RUCH.
DRAFT EQUALIZER.
APPLICATION FILED JAN. 12, 1914.
1,147,647.
Patented July 20, 1915.
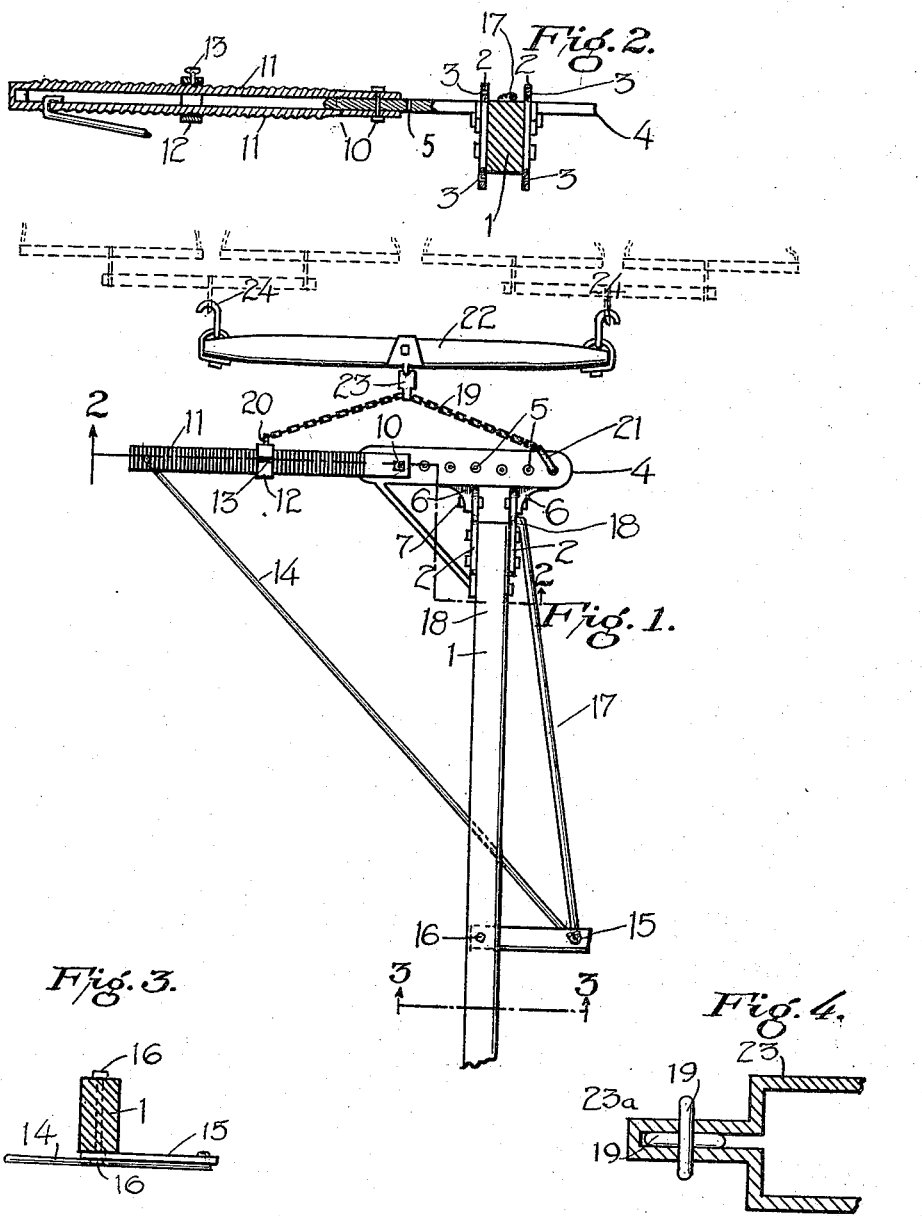

UNITED STATES PATENT OFFICE.

LEONARD H. RUCH, OF WINCHESTER, TENNESSEE.

DRAFT-EQUALIZER.

1,147,647.  Specification of Letters Patent.  Patented July 20, 1915.

Application filed January 12, 1914. Serial No. 811,670.

*To all whom it may concern:*

Be it known that I, LEONARD H. RUCH, a citizen of the United States, residing at Winchester, in the county of Franklin and State of Tennessee, have invented certain new and useful Improvements in Draft-Equalizers; and I do hereby declare the following to be a full, clear, and exact description of the invention, such as will enable others skilled in the art to which it appertains to make and use the same.

This invention relates to draft equalizers, and one of the principal objects of the invention is to provide simple, reliable and efficient means for quickly adjusting the draft devices to change the line of draft and to eliminate side draft on various characters of agricultural implements.

Another object of the invention is to provide a draft equalizer designed more particularly for use with plows, in which means of simple construction is provided for quickly adjusting the depth of cut of the plow, and also to adjust the draft devices to eliminate side draft and to prevent crowding of the draft animals.

These and other objects may be attained by means of the construction illustrated in the accompanying drawing, in which, Figure 1 is a plan view of a draft equalizer made in accordance with this invention, Fig. 2 is a sectional view taken on the line 2—2 of Fig. 1, looking in the direction indicated by the arrow, and Fig. 3 is a sectional view taken on the line 3—3 of Fig. 1, looking in the direction indicated by the arrow. Fig. 4 is an enlarged detail sectional view of one of the clevises.

Referring to the drawings the numeral 1 designates the beam of a plow or other implement, and connected to the front end of the beam is a clevis comprising two members 2, said members being secured to opposite sides of the beam and provided with alined apertures 3. A horizontal clevis 4 adjustably connected to the clevis members 2, by means of spaced lugs 6 which are connected to the clevis members 2 by means of bolts 7. Thus, it will be seen that adjustment may be quickly had both vertically and horizontally to change the line of draft to suit various conditions and implements. The clevis 4 is provided with a series of perforations 5 and connected pivotally to the clevis 4 by means of bolt 10 through apertures 5 is a draft bar 11 said draft bar comprising upper and lower members, spaced apart, to receive the ends of the clevis 4. The clevis 4 is provided with perforations 5 and secured to the clevis, by means of a bolt 10 passing through one of said perforations, is a draft bar 11, comprising upper and lower members spaced apart to receive the end of the clevis, as shown in Fig. 2. The members 11 are corrugated on their outer surfaces and an adjustable loop or link 12 may be adjusted in and out of the draft bar 11 and held in adjusted position by means of a thumb nut 13.

A diagonal rod 14 is connected near the outer end of the draft bar 11 and extends diagonally backward to a lever 15 pivoted at 16 to the beam 1. Also connected to the lever 15 is a rod 17 which extends forward and is connected, at 18, to the beam.

A draft chain 19 is connected at one end to the adjustable loop 12 at 20, while the opposite end of said chain is adjustably connected to the clevis 4 at 21 through perforations 5. The draft line may be adjusted by connecting the chain at any of the perforations 5 at one end and by securing the loop 12 at any point on the draft bar 11. A double tree 22 is provided with a clevis 23, having a contracted portion 23$^a$ to receive the links of the chain 19. The contracted portion 23$^a$ of the clevis permits any one link of the chain 19 to be inserted flatwise, while the adjacent links are disposed at right angles thereto, thus making a rigid connection, and permitting adjustment to change the draft line. Connected to the hooks 24 at the ends of the double tree 22 are double trees and swingle trees, (shown in dotted lines in Fig. 1). Swingle trees may be directly connected to the hooks 24 if so desired.

From the foregoing it will be obvious that the line of draft may be quickly adjusted by means of the clevises 2 and 4 and that side draft may be eliminated by adjusting the loop or link 12 on the draft bar 11 and the opposite end of the chain 19 in any one of the perforations 5 in the clevis 4.

My invention is comparatively simple in construction, and is composed of few parts which cannot get out of order, and owing to the arrangement shown, quick adjustment may be made for various conditions and many characters of agricultural implements.

What is claimed is:—

A draft equalizer comprising a clevis connected to the beam of a plow, a horizontal clevis connected thereto, a draft bar connected to the horizontal clevis, said draft bar having a corrugated upper and lower member, said members being spaced apart, a chain adjustably connected at one end to said horizontal clevis, and at the other end to a loop adjustable upon the corrugated members of the draft bar, a brace rod extending from the draft bar to a lever pivoted at the opposite side of the beam, and a rod extending from said lever to one of the members.

In testimony whereof I affix my signature in presence of two witnesses.

LEONARD H. RUCH.

Witnesses:
LEAH GONSOLIN,
I. M. RAMSEY.